Patented Apr. 15, 1941

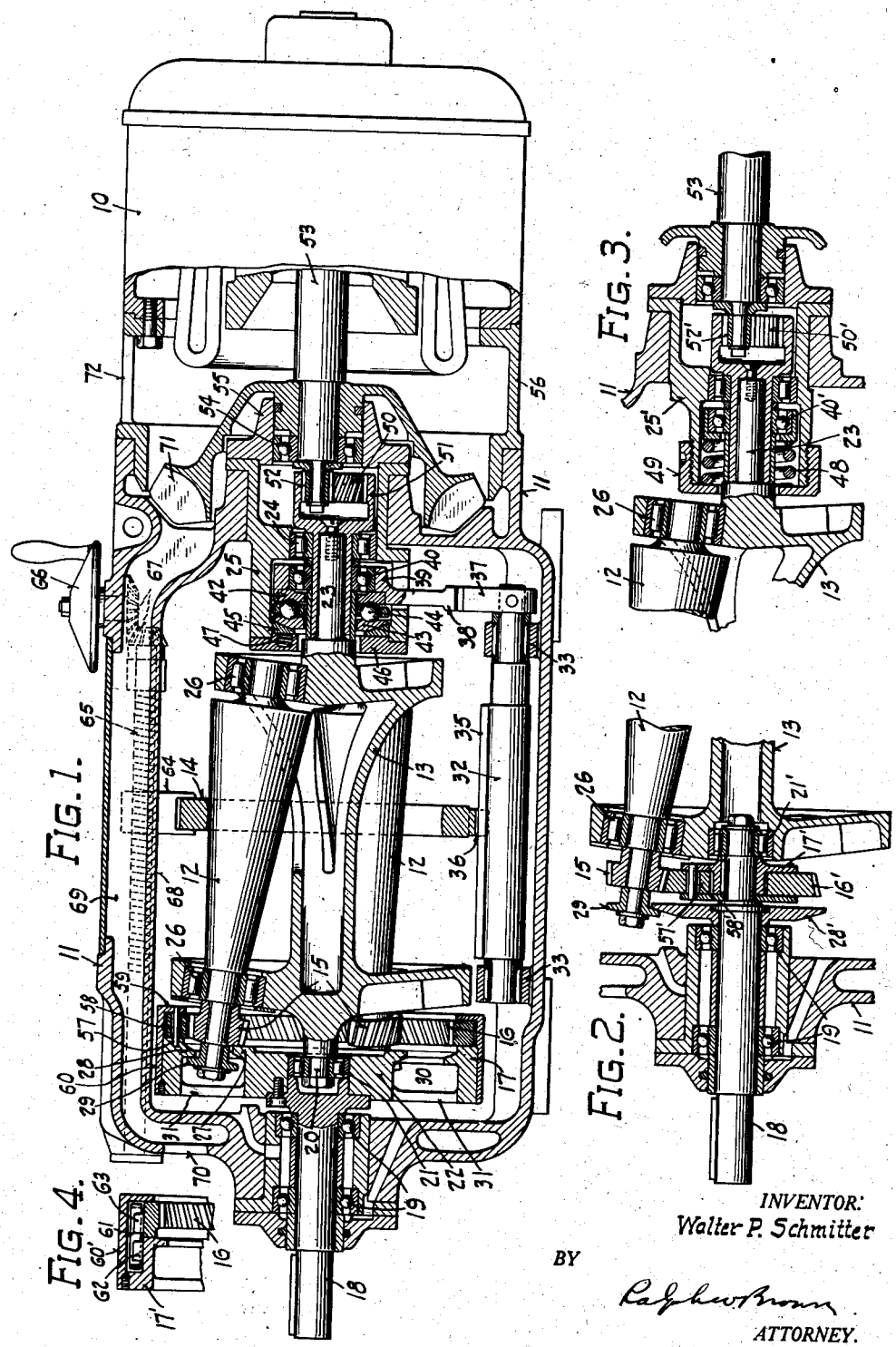

2,238,801

UNITED STATES PATENT OFFICE 2,238,801

VARIABLE SPEED TRANSMISSION

Walter P. Schmitter, Milwaukee, Wis., assignor to The Falk Corporation, Milwaukee, Wis., a corporation of Wisconsin Application July 14, 1937, Serial No. 153,607

18 Claims. (Cl. 74—281)

This invention relates to variable speed transmissions of the type involving a plurality of tapered inclined planet rollers controlled by a traction ring arranged for movement lengthwise of the rollers.

A variable speed transmission of this type is disclosed in the copending application of Alfred G. Bade, Serial No. 121,110, filed January 18, 1937, in which the carrier for the rollers is movable lengthwise of and with respect to the rollers in a manner to develop contact pressures between the rollers and ring.

A general aim of the present invention is to further improve the construction and operation of transmissions of this type.

A more specific object is to incorporate a load equalizing system designed to coact with the rollers in a manner to insure that each will carry its share of the total torque load.

Another object is to provide simple and improved means for fixing the rollers against lengthwise movement.

Another object is to combine an electric motor with a transmission of the character described in a manner to provide a self-contained, variable speed, power unit.

Other more specific objects and advantages will appear, expressed or implied, from the following description of an illustrative embodiment of the present invention.

In the accompanying drawing:

Figure 1 is a vertical, longitudinal, sectional view of a variable speed power unit constructed in accordance with the present invention.

Figs. 2, 3 and 4 are fragmentary sectional views illustrating alternative forms of various structural features thereof.

The power unit selected for illustration comprises an electric motor 10 detachably fixed to and supported by one end of a housing 11 of a variable speed power transmission device of the type described in the copending application hereinabove identified.

The transmission shown in Fig. 1 includes a plurality of relatively inclined tapered planet rollers 12, mounted to rotate with and with respect to a rotary carrier 13, and controlled by an encircling ring 14 which contacts all of the rollers and which is movable lengthwise of the latter to regulate their motion. Each roller carries a planet pinion 15 fixed thereto, the several pinions 15 meshing with an encircling ring gear 16 mounted for rotation with a carrier disk 17 fixed to the inner end of a driven shaft 18 projecting through that end of the housing 11 opposite the end to which the motor 10 is attached.

In this instance the driven shaft 18 is journalled in appropriate axially spaced bearings 19 in the housing end and serves to support one end of the roller carrier 13, the latter having an integral stub shaft 20 journaled in a bearing 21 fixed in the hub portion 22 of the gear carrier 17. The other end of the roller carrier 13 is supported by a similar shaft 23 projecting axially therefrom and journalled in a bearing 24 fixed in a cage 25 removably mounted in the housing end. The bearings 21 and 24 are of an axially adjustable type to permit free axial movement of the carrier 13.

Each roller 12 is supported in opposite ends of the carrier by similar axially adjustable bearings 26 so as not to interfere with the freedom of movement of the carrier 13 axially, the rollers being retained against lengthwise movement preferably by means which will now be described. In this instance the hub 22 of the gear carrier is provided with an outwardly projecting continuous ring or shoulder 27 which bears against an end face of each pinion 15 to hold the several rollers against movement toward the left; and the periphery of the gear carrier is provided with a similar but inwardly projecting ring or shoulder 28 which bears against collars 29, each fixed to one of the rollers in a manner to hold the several rollers against movement toward the right, it being understood that the carrier 17 is hollow and provides an annular chamber 30 open on that side toward the rollers to accommodate the collars 29 and their mountings. For purposes of assembly, the carrier 17 is also provided with side openings 31 through which access may be had to the collars 29.

With the rollers 12 thus fixed against lengthwise movement and relatively inclined in the manner shown, any thrust against the roller carrier 13 urging it toward the right reacts through the bearings 26 to force the rollers outwardly against the ring 14 in a manner to increase the contact pressures between the rollers and ring. In the transmission shown in Figure 1, the carrier 13 is urged toward the right by means energized by the torque load on the ring 14 in a manner somewhat similar to that disclosed in the copending application hereinabove identified. Improved means for this purpose will now be described.

The means shown comprises a rock shaft 32 journalled in appropriate brackets 33 in the bottom of the housing 11 adjacent the ring 14 and extending parallel to the axis thereof. The shaft 32 is provided with a plurality of longitudinal ribs 35, constituting extended gear teeth, which mesh with a segmental gear formation 36 on the outer periphery of the ring 14. A segmental gear 37, fixed to one end of the shaft 32, meshes with a segmental gear 38 having a hub 39 disposed within the cage 25 and rotatably mounted on a thrust-sustaining ball bearing 40 fixed on the shaft 23. The hub 39 carries a cam ring 42, rotatable therewith, which coacts with a non-rotatable cam ring 43 and a set of interposed balls 44 to exert an axial thrust upon the bearing 40 and shaft 23 in response to rotation of the hub 39. In this instance, the reactive thrust imposed on the cam ring 43 is sustained by a centering ring 45 normally seated against the end head 46 of the cage 25 and yieldably urged by a plurality of springs 47 to maintain an initial pressure between the balls 44 and cam rings.

The arrangement is such that any torque load imposed upon the ring 14 by the rollers 12 is transmitted through the gear teeth 36 and 35 to the rock shaft 32, and thence through the gears 37 and 38 to the cam ring 42, tending to rotate the latter and thereby imposing an end thrust on the shaft 23 in a direction to urge the roller carrier 13 toward the right. As above pointed out, the roller carrier 13, thus urged, reacts on the rollers 12 to force them against the ring 14 and thereby develop contact pressures between the rollers and ring of a magnitude proportional to the torque load on the transmission.

It will be noted that the use of gears 36, 35, 37 and 38 in the manner described affords a greater range of motion than does the system of levers employed in the application hereinabove identified and at the same time maintains a constant relation between the torque load on the control ring 14 and the torque load on the cam ring 42 in all angular positions of the rock shaft 32. Since the contact pressures between the rollers 12 and ring 14 are proportional to the thrust imposed on the carrier 13 by the cam ring 42, and since this thrust is proportional to the torque on the cam ring 42 which, by the gearing shown, is maintained proportional to the torque load on the ring 14, it necessarily follows that the contact pressures against the ring 14 are proportional to the torque load on the ring.

As an alternative, provision may be made for maintaining a predetermined axial thrust upon the roller carrier 13 in a direction to maintain contact pressures of predetermined magnitude between the rollers 12 and ring 14 by means such, for instance, as that illustrated in Fig. 3. In this instance a heavy compression spring 48 is shown, interposed between a flanged nut 49, threaded on the end of the cage 25', and a thrust sustaining bearing 40' on the carrier shaft 23, so that the carrier is yieldably urged toward the right by the thrust of the spring 48 which may be regulated by adjustment of the nut 49.

The roller carrier 13 in the device shown is directly driven from the motor 10 preferably through speed reduction gearing, to avoid objectionable high carrier and roller speeds, to permit freedom of axial movement of the carrier 13, and to afford ready removal of the motor. The gearing shown includes an internal gear 50, formed within a drum 51 removably fixed to the carrier shaft 23, and meshing with a pinion 52 removably fixed to the end of the motor shaft 53, and arrangement which affords the desired reduction in carrier speed with a minimum offset relation between the axes of the shafts 23 and 53.

In this instance the motor shaft 53 is journalled in a bearing 54 seated in an end head 55 detachably fixed to the cage 25, and the motor housing is detachably mounted on the end of the housing 11 through an appropriate adapter 56. It will be noted that the arrangement shown permits ready withdrawal of the motor 10, with its shaft 53 and pinion 52, from the housing 11, end head 54, and gear 50.

The gear 50 and coacting pinion 52 are preferably of the single helical type with the helix angle of the teeth in such direction that the transmitted torque tends to further increase the axial thrust on the roller carrier 13, to thereby further increase the contact pressures between the rollers 12 and ring 14 as the driving torque increases, the helix angle also being such as to oppose the thrust resulting from the reaction of the single helical pinions 15 and gear 16. However, straight spur gears may be employed as indicated at 50' and 52' in Fig. 3.

Provision is made in the device shown for effecting a substantially equal distribution of the torque load among the several rollers 12, so as to insure that each carries its proportionate share of the total load, and thereby make it possible to transmit a maximum load without slippage between any of the rollers 12 and the ring 14. To accomplish this, correction or compensation must be made for slight differences in the planetary movements of the rollers, due, for instance, to slight differences in the radii of the several rollers at their respective points of contact with the ring 14.

In the machine shown, this is accomplished by so mounting the gear 16 as to permit free radial movement of the latter relative to the pinions 15. For this purpose the gear 16, in the device of Fig. 1, is connected in driving relation with its carrier 17 solely through a single fulcrum pin 57 anchored in the carrier and projecting loosely through a radial slot 58 formed in the body of the gear, so that the gear is free to swing about the pin 57 and to shift along a diameter through the pin. An inturned flange 59 carried by a ring 60 removably fixed to the periphery of the gear carrier 17 coacts with the carrier to loosely retain the gear against tilting out of its proper plane.

The arrangement is such that if the torque load on any of the rollers 12 is materially in excess of the load on the others, the resulting increased tooth pressure between its pinion 15 and gear 16 will force the gear 16 radially outward therefrom to relieve the pressure and to thereby so vary the action between that pinion and gear as to compensate for the abnormal planetary action of the roller which caused that abnormal load. In other words the gear 16 is radially free to assume a position which will equalize the tooth pressures between the several pinions 15, thereby not only automatically equalizing the load on the several rollers 12, but also so modifying the tooth action between the several pinions 15 and gear 16 as to compensate for any slight differences in the planetary movements of the individual rollers.

Another method of gear mounting for the same purpose is illustrated in Fig. 4, wherein the gear 16 is connected in driving relation with its carrier 17' through a surrounding grid-like resilient connector 61 formed of spring steel and interengaged with and between peripheral teeth 62 and 63 formed on the carrier and gear, respectively.

In this instance the gear and connector 61 are both loosely confined by a flanged ring 60' fixed to the carrier.

In Fig. 2 is illustrated another variation of the invention wherein an external gear 16' has been substituted for the corresponding internal gear shown in Fig. 1. In this instance the gear 16', engaging the several planet pinions 15 of the rollers 12, is floatably mounted in a similar manner upon a carrier 17' fixed to the driven shaft 18, a single fulcrum pin 57', engaged in a radial slot 58' in the gear, constituting the sole driving connection between the gear and carrier 17'. The gear 16' is thus free to shift radially in any direction so as to equalize the pressures between it and the pinions 15.

In the arrangement shown in Fig. 2, the roller carrier 13 is supported at one end by the projected end of the driven shaft 18 through an axially adjustable bearing 21', and similar axially adjustable bearings 26 support the rollers 12 in the carrier, so that the carrier is free to shift axially relative to the driven shaft 18 and the rollers. A collar 28' on the driven shaft 18 coacts with collars 29 on the rollers 12 to sustain the rollers against lengthwise movement with the carrier 13.

In the transmission shown in Fig. 1, the control ring 14 is shiftable along the rollers 12 under the action and control of a forked nut 64, which is loosely engaged with the ring, and which is threaded upon an actuating and control screw 65 journalled in appropriate brackets in the top of the housing 11. The screw 65, and consequently the nut 64, are actuated and controlled by appropriate means, such as a hand wheel 66, mounted externally of the housing 11 and connected to the screw shaft 65 through appropriate gearing 67.

For purposes of cooling, the housing is provided with inner walls 68 spaced from the outer wall and coacting therewith to form air conducting channels 69 which extend the full length of the housing. Air entering ports 70 at the forward end of the housing is induced to flow through the channels 69 by the action of a centrifugal fan 71 carried by and rotating with the motor shaft 52. This cooling air exhausts through appropriate openings 72 in the adapter 56.

Various changes may be made in any of the embodiments of the invention hereinabove specifically described without departing from or sacrificing the advantages of the invention as defined in the appended claims.

I claim:

1. A variable speed transmission comprising a rotor, a plurality of relatively inclined tapered planet rollers rotatable with and with respect to said rotor, a ring engaging said rollers and movable lengthwise thereof to regulate the speed ratio of the transmission, and means responsive to the torque loads on said rollers for equalizing said loads.

2. A variable speed transmission comprising a rotor, a plurality of relatively inclined tapered planet rollers rotatable with and with respect to said rotor, a ring engaging said rollers and movable lengthwise thereof to regulate the speed ratio of the transmission, and gearing connecting said rollers and automatically adjustable to substantially equalize the torque loads on said rollers.

3. A variable speed transmission comprising a rotor, a plurality of relatively inclined tapered planet rollers rotatable with and with respect to said rotor, a ring engaging said rollers and movable lengthwise thereof to regulate the speed ratio of the transmission, and load transmitting gearing including a set of gears relatively adjustable in response to the torque loads on said rollers to substantially equalize said loads.

4. A variable speed transmission comprising a rotor, a plurality of relatively inclined tapered planet rollers rotatable with and with respect to said rotor, a ring engaging said rollers and moveable lengthwise thereof to regulate the speed ratio of the transmission, a plurality of planet pinions each connected in driving relation with one of said rollers, and a load transmitting gear coacting with said pinions and radially moveable in response to the torque loads on said pinions to substantially equalize the loads on said rollers.

5. A variable speed transmission comprising a rotor, a plurality of relatively inclined tapered planet rollers rotatable with and with respect to said rotor, a ring in pressure contact with said rollers and moveable lengthwise thereof to regulate the speed ratio of the transmission, a plurality of planet pinions each connected in driving relation with one of said rollers, and a load transmitting gear engaged with said pinions, said ring being radially moveable to substantially equalize the contact pressures between it and said rollers, and said gear being radially moveable to substantially equalize the torque loads on said rollers.

6. In a device of the character described, the combination of a rotor, a plurality of planet members rotatable with and with respect to said rotor, means engaging said members to control the planetary action thereof, a plurality of planet pinions each connected in driving relation with one of said members, and a torque transmitting gear engaged with said pinions and freely adjustable relative thereto in response to the torque loads on said planet gears to substantially equalize the torque loads on said members.

7. In a device of the character described, the combination of a rotor, a plurality of planet members rotatable with and with respect to said rotor, means engaging said members to control the planetary action thereof, a plurality of planet gears each connected in driving relation with one of said members, and a load transmitting ring gear encircling and engaging said planet gears and radially moveable to substantially equalize the torque loads on said members.

8. In a device of the character described the combination of a rotor, a plurality of planet members rotatable with and with respect to said rotor, means engaging said members to control the planetary action thereof, a plurality of planet gears each connected in driving relation with one of said members, and a load transmitting sun gear engaging said planet gears and radially moveable to substantially equalize the torque loads on said members.

9. In a device of the character described the combination of a rotor, a plurality of planet members rotatable with and with respect to said rotor, means engaging said members to control the planetary action thereof, load transmitting gearing automatically adjustable in response to the torque loads on said members to substantially equalize those loads, and means operable independently of said gearing for driving said rotor.

10. In a device of the character described, the combination of an axially movable rotor, a plurality of planet members mounted in and rotatable with and with respect to said rotor, means engaged with said members to control their planetary action, means responsive to axial movement of said rotor for developing contact pressures between said members and said first named means, a driver for said rotor, and an axially yieldable driving connection between said driver and rotor permitting axial movement of said rotor relative to said driver.

11. In a device of the character described, the combination of an axially movable rotor, a plurality of planet members rotatable with and with respect to said rotor, means engaged with said members to control their planetary action, means responsive to axial movement of said rotor for developing contact pressures between said members and said means, a driver for said rotor, and means including a pair of coacting gears relatively moveable axially for effecting a driving connection between said driver and rotor and permitting axial movement of said rotor relative to said driver.

12. In a device of the character described, the combination of an axially movable rotor, a plurality of planet members rotatable with and with respect to said rotor, means engaged with said members for controlling their planetary action, means responsive to axial movement of said rotor for developing contact pressures between said members and said first named means, a drive shaft, and means including a pair of intermeshing single-helical gears through which said rotor is driven from said shaft, said gears reacting to impose an axial thrust on said rotor.

13. In a device of the character described, the combination of an axially movable rotor, a plurality of planet members rotatable with and with respect to said rotor, means engaged with said members to control the planetary action thereof, means responsive to axial movement of said rotor for inducing contact pressures between said members and said first named means, a drive shaft, and means responsive to the torque load on said drive shaft for imposing a pressure inducing axial thrust on said rotor.

14. In a variable speed transmission, the combination of a rotor, a plurality of relatively inclined tapered planet rollers rotatable with and with respect to said rotor, said rollers and rotor being mounted for relative lengthwise movement, a driven single-helical gear, single-helical planet gears connected with said rollers respectively and reacting on said driven gear to urge said rollers lengthwise in one direction, and driving means for said rotor including single-helical gears reacting to urge said rotor axially in an opposite direction.

15. In a variable speed transmission, the combination of an axially moveable rotor, a plurality of relatively inclined planet rollers mounted in and rotatable with and with respect to said rotor, a control member encircling and contacting said rollers, elastic biasing means for urging said rotor axially in one direction, and means responsive to the axial thrust thus imposed on said rotor for forcing said rollers against said member.

16. In a variable speed transmission the combination of a rotor, a plurality of relatively inclined tapered planet rollers mounted in and rotatable with and with respect to said rotor, means encircling and contacting said rollers and moveable lengthwise thereof to regulate the speed ratio of the transmission, said rollers and said rotor being relatively moveable axially of said rollers to thereby urge said rollers against said encircling means, driving means for said rotor including single helical gears reacting to impose an axial thrust upon said rotor, and driven means including a single helical driven gear and single helical pinions connected with said rollers respectively and reacting with said driven gear to impose an axial thrust on said rollers.

17. In a variable speed transmission the combination of an axially moveable rotor, a plurality of relatively inclined tapered planet rollers rotatable with and with respect to said rotor, means encircling and contacting said rollers and moveable lengthwise thereof to regulate their motion, a driven shaft responsive to the planetary motion of said rollers, means carried by said shaft forming right and left hand peripheral shoulders, means carried by each of said rollers forming shoulders coacting with said first named shoulders to control the lengthwise position of said rollers, and means responsive to axial movement of said rotor for forcing said rollers against said encircling means.

18. In a variable speed transmission the combination of an axially moveable rotor, a plurality of relatively inclined tapered planet rollers rotatable with and with respect to said rotor, means encircling and contacting said rollers and moveable lengthwise thereof to regulate their motion, a driven shaft responsive to the planetary motion of said rollers, a member carried by said shaft and having a peripheral shoulder, means carried by each of said rollers forming a shoulder coacting with said first named shoulder to restrain said rollers against endwise movement with said rotor, and means responsive to axial movement of said rotor for forcing said rollers against said encircling means.

WALTER P. SCHMITTER.